(12) United States Patent
Gupta (10) Patent No.: US 8,584,188 B2
(45) Date of Patent: Nov. 12, 2013

(54) SYSTEM AND METHOD FOR DISPLAYING CALL STATUS ON TV

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 660 days.

(21) Appl. No.: 12/358,022

(22) Filed: Jan. 22, 2009

(65) Prior Publication Data

US 2010/0186055 A1 Jul. 22, 2010

(51) Int. Cl.
*H04N 7/173* (2011.01)

(52) U.S. Cl.
USPC .......... 725/106; 725/100; 725/110; 725/131; 725/139; 725/151

(58) Field of Classification Search
USPC .......... 725/100, 106, 110, 131, 160, 139, 151
See application file for complete search history.

(56) References Cited

U.S. PATENT DOCUMENTS

| | | | |
|---|---|---|---|
| 6,882,709 B1 * | 4/2005 | Sherlock et al. | 379/90.01 |
| 7,835,506 B2 * | 11/2010 | Groff et al. | 379/90.01 |
| 8,433,304 B2 | 4/2013 | Gupta | |
| 2001/0038690 A1 * | 11/2001 | Palmer et al. | 379/218.01 |
| 2006/0140350 A1 * | 6/2006 | Jorasch et al. | 379/32.01 |
| 2007/0049290 A1 * | 3/2007 | Mullen | 455/456.1 |
| 2007/0140150 A1 | 6/2007 | Beck et al. | |
| 2007/0140299 A1 | 6/2007 | Hofmann et al. | |
| 2007/0254628 A1 * | 11/2007 | Rybak | 455/405 |
| 2008/0019494 A1 | 1/2008 | Toda | |
| 2008/0125098 A1 | 5/2008 | Bruce et al. | |
| 2009/0186629 A1 * | 7/2009 | Soelberg et al. | 455/456.1 |
| 2009/0228940 A1 * | 9/2009 | Zampiello | 725/106 |
| 2010/0184486 A1 | 7/2010 | Gupta | |

OTHER PUBLICATIONS

U.S. Appl. No. 12/358,038; Final Rejection dated Sep. 28, 2011; 14 pages.
U.S. Appl. No. 12/358,038; Non-Final Rejection dated May 23, 2011; 12 pages.
U.S. Appl. No. 12/358,038; Notice of Allowance dated May 25, 2012; 15 pages.
U.S. Appl. No. 12/358,038; Issue Notification dated Apr. 10, 2013; 1 page.
U.S. Appl. No. 12/358,038; Notice of Allowance dated Jan. 4, 2013; 19 pages.

* cited by examiner

*Primary Examiner* — Mulugeta Mengesha
(74) *Attorney, Agent, or Firm* — Swanson & Bratschun, L.L.C.

(57) ABSTRACT

Embodiments of the disclosed invention include a system and a method for displaying, among other things, call status information associated with one or more communication devices on a television. In one embodiment, an integrated set top box is disclosed that includes a memory component for storing computer executable instructions; a data storage unit for storing data associated with at least one monitored communication device; a communication interface in communication with a cable head end for receiving communication data associated with the monitored communication device and television media content; a decoder for decoding the television media content; and a processing unit for executing the computer executable instructions to generate a user interface using the communication data to depict a call status associated with the monitored communication device on a television couple to the set top box.

16 Claims, 4 Drawing Sheets

SYSTEM AND METHOD FOR DISPLAYING CALL STATUS ON TV

CROSS REFERENCE TO RELATED APPLICATION

The present invention is related to the following patent application: entitled "System and Method for Displaying Cellular Caller ID on TV", Ser. No. 12/358,038; filed even date hereof, assigned to the same assignee, and incorporated herein in its entirety by reference.

BACKGROUND

An IP set top box is a dedicated computing device that serves as an interface between a television set and a broadband network. In addition to decoding and rendering broadcast TV signals, an IP set top box can provide functionality that includes video-on-demand (VOD), Electronic Program Guide (EPG), digital rights management (DRM), and a variety of interactive and multimedia services. These types of advanced functionality are in demand by end-users and enable incremental network operator service opportunities.

SUMMARY OF THE INVENTION

Embodiments of the disclosed invention include an integrated set top box for displaying call status information associated with a monitored communication device. In one embodiment, the integrated set top box includes a memory component for storing computer executable instructions; a data storage unit for storing data associated with at least one monitored communication device; a communication interface in communication with a cable head end for receiving communication data associated with the monitored communication device and television media content; a decoder for decoding the television media content; and a processing unit for executing the computer executable instructions to generate a user interface using the communication data to depict a call status associated with the monitored communication device on a television couple to the set top box.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
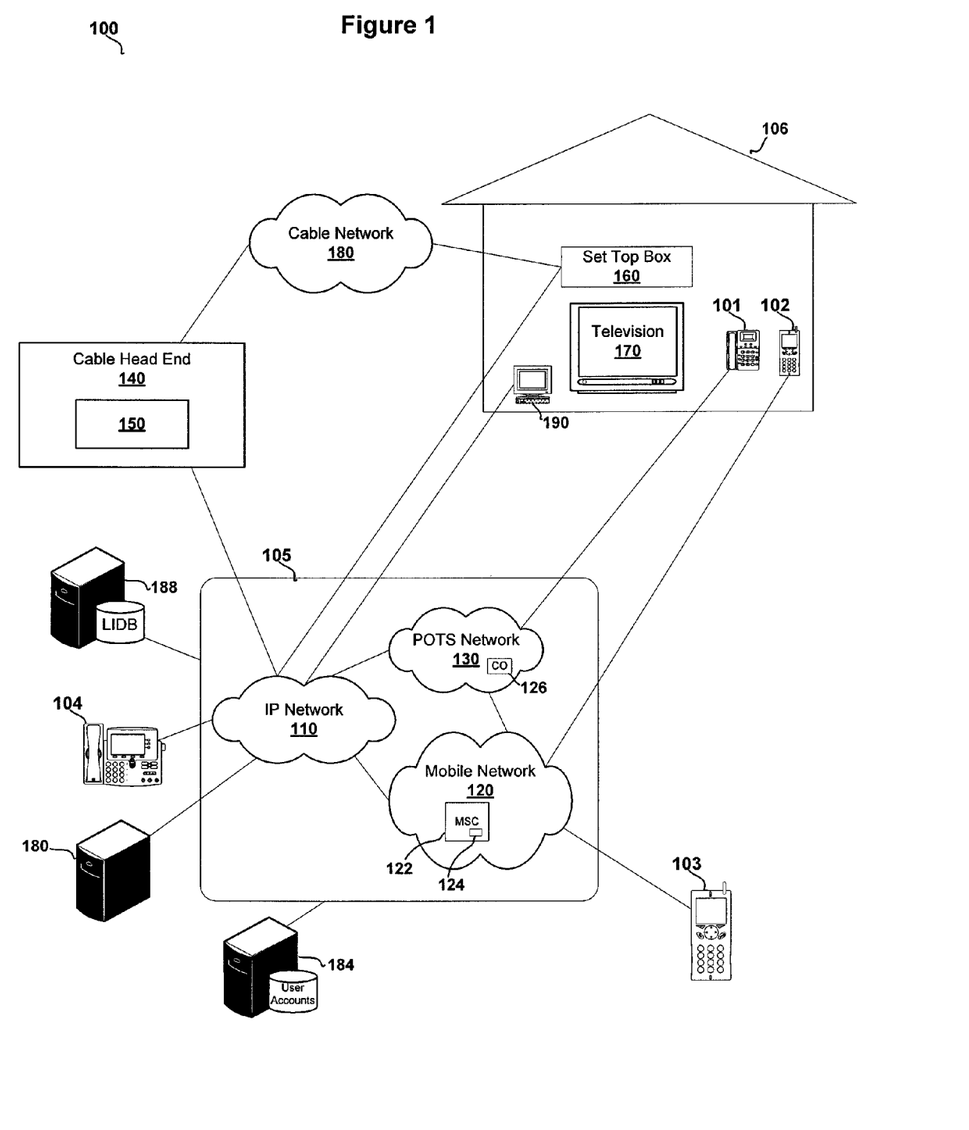
FIG. 1 depicts an embodiment of a network environment in which the illustrative embodiments may be implemented.

FIG. 1 depicts a network environment 100 in which the illustrative embodiments may be implemented for displaying information, such as, but not limited to, the call status, associated with a monitored communication device on TV. As referenced herein, the terms "call status" refers to whether the monitored communication device is actively transmitting over a voice channel. A voice channel is a transmission channel or subchannel that has the necessary bandwidth to carry human voice. A monitored communication device may be any type of communication device including, but not limited to, a landline telephone, a cellular phone, and/or a voice over IP phone, that is associated with a subscriber of this service. For example, in FIG. 1, communication devices 101-104 may be monitored communication devices associated with a subscriber residing in home location 106. Communication devices 101-104 may communicate with one another and/or other communication devices via communications network 105.

In accordance with one embodiment, communications network 105 may include a mobile network 120, a public switched telephone network (PSTN) 130, and an IP network 110, for communicating voice and data to one or more devices. In one embodiment, mobile network 120, public switched telephone network (PSTN) 130, and IP network 110 exchange information across different platforms via one or more gateways, such as, but not limited to, a media gateway and/or a mobile switching center gateway.

As will be further described, in accordance with one embodiment, a data processing system 124, such as, but not limited to, a telephone switch, may communicate with one or more data processing systems and/or devices, such as, but not limited to, a server 180, a subscriber account database server 184, and a line information database (LIDB) 188, over communications network 105 for determining and routing information associated with a monitored communication device to a cable head end 140. Data processing system 124 may be located at a telephone company-switching center, such as, a mobile station center 122 or a central office 126. In one embodiment, data processing system 124 may comprise, among other things, a memory component for storing computer executable instructions, a communication interface for sending and receiving data, and a processing unit operable to execute the computer executable instructions to process the data. For instance, in some embodiments, data processing system 124 retrieves a subscriber account associated with the a communication device from subscriber account database server 184 to determine whether the subscriber subscribes to call status on TV service, and, if so, whether the communication device is a monitored communication device of the subscriber. Additionally, in some embodiments, data processing system 124 performs a lookup to determine the IP address of a device located at a local head end for routing the information to the subscriber via the cable network. Further, in some embodiments, data processing system 124 may determine the location of the monitored communication device and/or the location of the other calling party in communication with the monitored communication device. For example, in some embodiments, data processing system 124 may retrieve global positioning coordinates and/or may triangulate the cellular signal associated with the monitored communication device to determine its position. Cellular triangulation is a process by which the location of a radio transmitter can be determined by measuring either the radial distance, or the direction, of the received signal from two or three different cell towers. In addition, in some embodiments, data processing system 124 may determine a subscriber name associated with the other calling party in communication with the monitored communication device by retrieving the subscriber name from line information database (LIDB) 188. Line information database (LIDB) 188 is a database maintained by a telephone company that contains subscriber information, such as, a service profile, name and address, and credit card validation information.

Cable head end 140 is a master facility for receiving television signals and other data for processing and distribution over a cable television system, such as, cable network 180. In some embodiments, cable head end 140 may be an unstaffed facility housing electronic equipment used to receive and re-transmit video and/or other data over cable network 180. In accordance with one embodiment, cable head end 140 may include a communication information reception device 150.

Communication information reception device 150 may be software, hardware, or a combination of hardware and software that is configured to receive, process, and transmit information associated with a monitored communication device to a set top box, such as, set top box 160, associated with a monitored communication device. For example, in some embodiments, the information associated with a monitored communication device may include, but is not limited, the call status, the location of the monitored communication device, billing and usage information associated with the monitored communication device, and an identifier/phone number of the other calling party (OCP) in communication with the monitored communication device. In some embodiments, communication information reception device 150 may route the information associated with the monitored communication device using a cable modem. A cable modem is a type of network interface that provides access to a data signal sent over the cable television infrastructure, such as, but not limited to, cable network 180 and/or via satellite. Alternatively, or in addition to, in some embodiments, communication information reception device 150 may route the communication information using Internet Protocol Television (IPTV). IPTV is a system where digital television service is delivered using Internet Protocol over a network infrastructure, such as, but not limited to, IP network 110.

In one embodiment, set top box 160 receives the communication information associated with a monitored communication device from cable head end 140. In some embodiments, set top box 160 includes hardware and/or software for processing the received communication information and for generating an interface that depicts, among other things, the call status associated with one or more monitored communication devices on television 170. In some embodiments, set top box 160 may display the user interface only on a particular channel. In another embodiment, set top box 160 may display the user interface as an overlay window over a television program. Additionally, in some embodiments, a user may configure set top box 160 to display the interface on television 170 for a specified amount of time in response to a change in call status condition associated with a monitored communication device.

Figure 2:
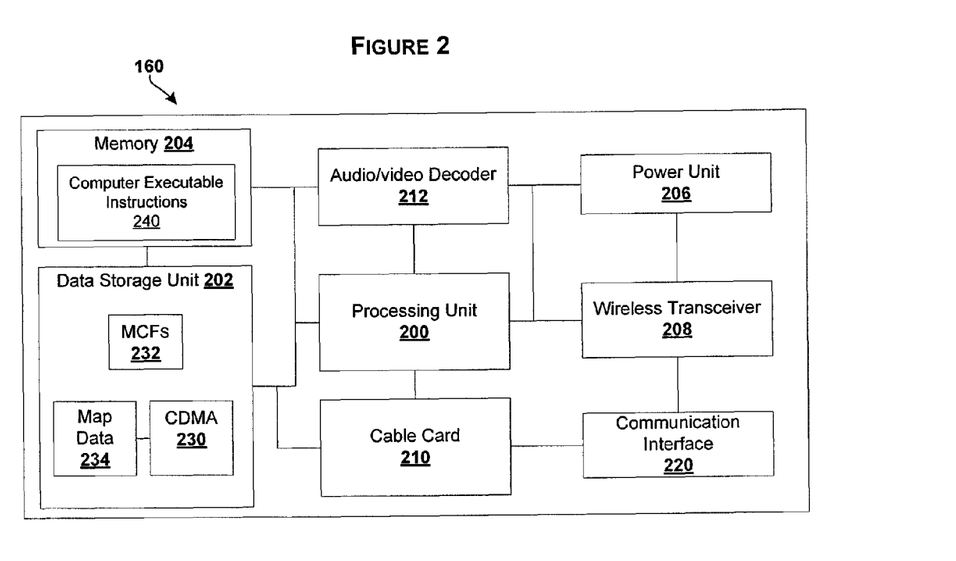
FIG. 2 depicts an embodiment of a set top box in accordance with the disclosed embodiments.

FIG. 2 illustrates one embodiment of set top box 160 in accordance with the disclosed embodiments. In the depicted embodiment, set top box 160 includes, but is not limited to, a processing unit 200, a data storage unit 202, a memory component 204, a power unit 206, a wireless transceiver 208, a cable card interface 210, an audio/video decoder 212, and a communication interface 220.

Processing unit 200 may comprise of one or more microprocessors for executing computer usable program code/instructions for displaying information, such as, but not limited to, the call status, associated with a monitored communication device. For example, in one embodiment, processing unit 202 may execute computer executable instructions 240 associated with communication device monitoring application (CDMA) 230 stored in data storage unit 202 for displaying the information associated with monitored communication devices 101-104.

Memory component 204 is a data storage component of set top box 160. In some embodiments, memory component 204 includes volatile memory. Volatile memory is memory that loses its contents when the computer or hardware device loses power. For example, in some embodiments, memory component 154 may be random access memory (RAM). Random access memory stores currently executing instructions and/or data utilized by an operating system, software program, hardware device, and/or a user.

Data storage unit 202 is a non-volatile memory component of set top box 160, such as, but not limited to, a hard disk drive. Non-volatile memory retains stored data when power is loss. In some embodiments, data storage unit 202 may be an external hard drive and/or a network data storage unit. In some embodiments, data storage unit 202 may be used to store media content files 232, such as, television content received from a cable head end 140. In addition to, in one embodiment, data storage unit 202 may also store mapping data 234 for enabling communication device monitoring application 230 to display a map depicting the location of a monitored communication device and/or, in some embodiments, the location of the other calling party in communication with a monitored communication device. As will be further described, communication device monitoring application 230 comprises computer executable instructions/code for handling data, comprising information associated with one or more monitored communication devices, received from cable head end 140 and presenting the information on a television unit.

Communication interface 220 provides connection ports for coupling set top box 160 to one or more electronic devices. For example, in one embodiment, communication interface 220 includes a video input/output interface, such as, but not limited to, a coaxial cable connection for coupling set top box 160 to a television 170 for displaying television content and information associated with a monitored communication device. Additionally, in some embodiments, communication interface 220 may include, but is not limited to, a RJ45 Ethernet port and/or a RJ11 telephone line port for communicatively coupling set top box 160 to cable head 140 and/or other data processing systems via IP network 110. Further, in some embodiments, communication interface 220 may include other connector ports, such as, but not limited to, a 1394 port, a universal serial bus (USB) port, and/or a high-definition multimedia interface (HDMI). For example, in some embodiments, communication interface 220 may enable a user to connect a USB keyboard to set top box 160 for enabling user input.

Cable card 210 is a plug-in cable/smart card that enables viewing and/or recording of cable television programming.

For example, in some embodiments, cable card 210 comprises instructions and/or a decryption key for decoding encrypted cable television signals transmitted by a cable provider.

Audio/video decoder 212 decodes media signals through communication interface 220 and generates the appropriate audio and/or video output for transmission to display unit 160. In some embodiments, audio/video decoder 212 uses a decryption key provided by cable card 210 to decode the received media signals.

Wireless transceiver 208 provides short-range exchange of data using, but not limited to, infrared light. For example, wireless transceiver 208 enables a user using a remote control device to operate and configure set top box 160. Additionally, in some embodiments, wireless transceiver 208 enables a user using a remote control device to select features and configure options associated with communication device monitoring application 230.

Finally, power unit 206 converts the input power from an AC adaptor to run various components of set top box 160. In some embodiments, power unit 202 may include an internal power source, such as, but not limited to, a battery component.

Figure 3:
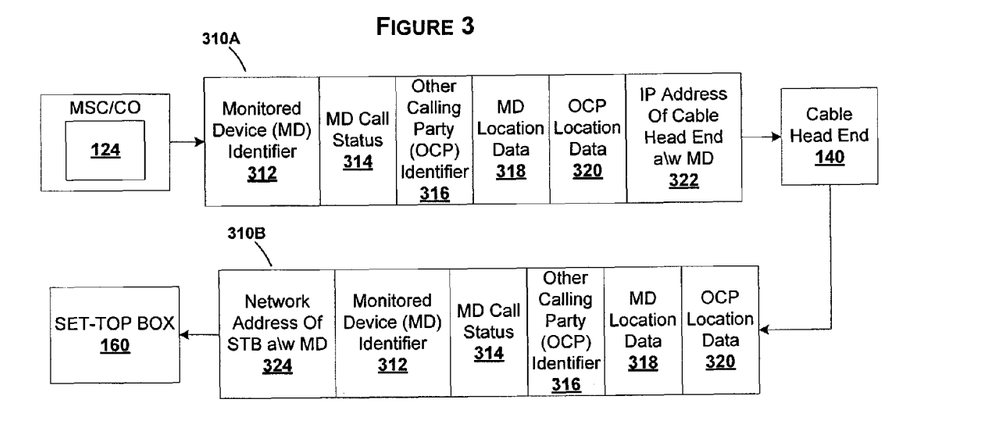
FIG. 3 depicts an embodiment of a data flow diagram in accordance with the disclosed embodiments.

With reference now to FIG. 3, a data flow diagram is presented in accordance with the disclosed embodiments. In the depicted embodiment, a data processing system 124 located at a mobile switching center/central office monitors and transmits information 310A associated with a monitored communication device to a cable head end. For example, in some embodiments, data processing system 124 performs a database lookup to determine the IP address 322 associated with a receiving device located at a cable head, such as, but not limited to, cable head end 140, that transmits television media content to a subscriber associated with a monitored communication device. Additionally, in some embodiments, the receiving device located at the cable head end performs a lookup to determine a network identifier 324, such as, but not limited to, an IP address, for transmitting information 310B to a set top box, such as, set top box 160, associated with a subscriber of the monitored communication device.

In accordance with one embodiment, information 310A and 310B may include an identifier 312, such as, but not limited to, a phone number, associated with a monitored communication device. Additionally, in some embodiments, information 310A/310B includes a call status 314. For example, in some embodiments, call status 314 may be a flag/variable indicating whether a monitored communication device is actively connected to a voice call. Further, in some embodiments, information 310A/310B may include an identifier 316, such as, but not limited to, a phone number, associated with a communication device of the other calling party. For example, in some embodiments, data processing system 124 retrieves the caller ID of the communication device associated with the other calling party and passes the calling ID information to cable head end 140. In addition, in some embodiments, a data processing system 124 may also retrieve a subscriber name from a line information database and pass the information to cable head end 140.

In accordance with some embodiments, information 310A/310B may also include location information 318 associated with a monitored communication device. In some embodiments, data processing system 124 may retrieve the location information of a monitored communication device, such as, a cellular device, even if the monitored communication device is not currently on an active call. For example, in some embodiments, data processing system 124 may retrieve global positioning coordinates and/or may triangulate the cellular signal transmitted by a monitored communication device. For instance, as long as a cellular device is powered on, the cellular device transmits a signal to enable mobile network 120 to locate the cellular device for connecting a call. Additionally, in some embodiments, information 310A/310B may also include location information 320 of a communication device associated with the other calling party in communication with the monitored communication device.

Figure 4:
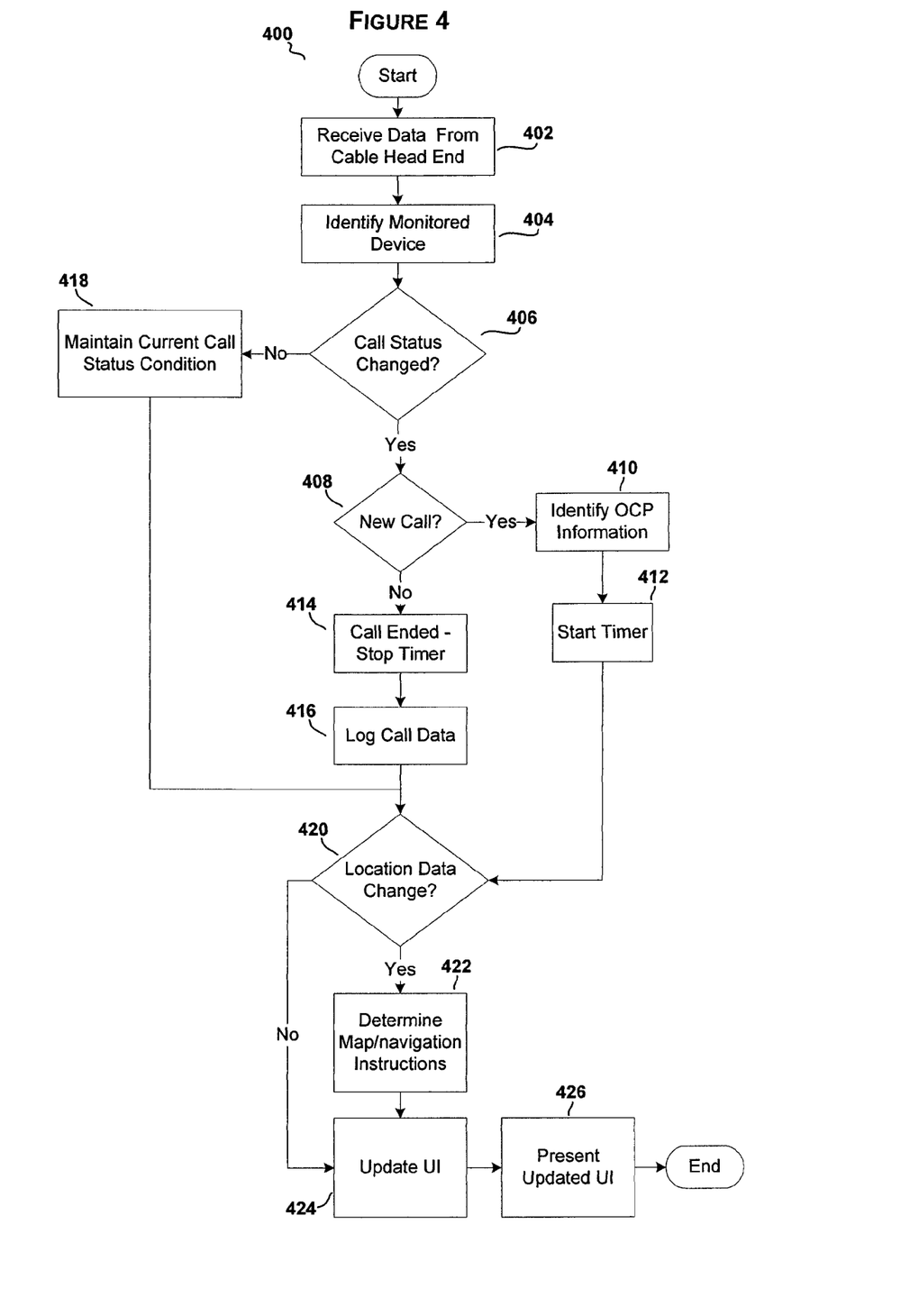
FIG. 4 depicts a flowchart of an embodiment of a process for displaying information associated with a monitored communication device on a television unit in accordance with the disclosed embodiments.

FIG. 4 depicts a flowchart of an embodiment of a process 400 for displaying information associated with a monitored communication device on a television unit. Process 400 may be performed by a set top box, such as, set top box 160. Process 400 begins, at step 402, by receiving information associated with a monitored communication device from a cable head end. At step 404, the process identifies a monitored communication device from the received data. The process determines, at step 406, whether the identified monitored communication device's call status has changed from a prior state. If the process determines, at step 406, that the call status has not changed, the process, at step 418, maintains the current call status condition. However, if the process determines a change in the call state has occurred, the process, at step 408, determines whether the monitored communication device is actively communicating on a new call. If the process determines that the monitored communication device is actively communicating on a new call, the process, at step 410, determines an identifier associated with the communication device of the other calling party in communication with the monitored communication device. The process, at step 412, initiates a timer for monitoring the time associated with the active communication.

However, if the process, at step 408, determines that the call status change because an active call has ended, the process, at step 414, stops a timer associated with the monitored communication device. In some embodiments, the process, at step 416, logs the calling information associated with a monitored communication device in a log file. In one embodiment, the log file is stored in data storage unit 202 and is retrievable by a subscriber to display a call history associated with a monitored communication device.

In some embodiments, the process, at step 420, determines whether location data associated with a monitored communication device has changed from a prior location. In these embodiments, if the process determines that the location data associated with a monitored communication device has changed from a prior location, the process, at step 422, may determine and/or update a map and/or navigational instructions associated with the monitored communication device. For example, in some embodiments, set top box 160 may present a user interface that depicts a map of the location of a monitored communication device. In some embodiments, the user interface may include an estimated distance and travel time from the current location of the monitored communication device to a home location associated with the subscriber. For example, set top box 160 may use mapping data 234 and the location information associated with a monitored communication device received from cable head 142 to depict the location of the monitored communication device on a map. In other embodiments, set top box 160 may access communications network 105 to retrieve the mapping information from a map server, such as, server 180. In addition, as will be further described, in some embodiments, the user interface may also enable set top box 160 to locate a user-specified point of interest in proximity of the location of a monitored communication device and provide directions/navigational instructions to the location of the point of interest and/or any other user-specified address. For example, in one embodiment, set top box 160 may access a search engine on the Internet via communications network 105 for determining the location of a user-specified point of interest in proximity of the location of a monitored communication device. Further, in some embodiments, set top box 160 may access a network address book and provide directions/navigational instructions to an address of a contact in the network address book. In other words, in some embodiments, a user located at a home location may provide directions to a user-specified location to a person in possession of a monitored communication device. Further, the disclose embodiment enables a parent to monitor the location a child in possession of a monitored communication device, in addition to, all calling activities associated with the monitored communication device.

At step 424, the process updates the user interface with the updated information. The process presents the updated user interface on a television at step 426, with process 400 terminating thereafter.

Figure 5:
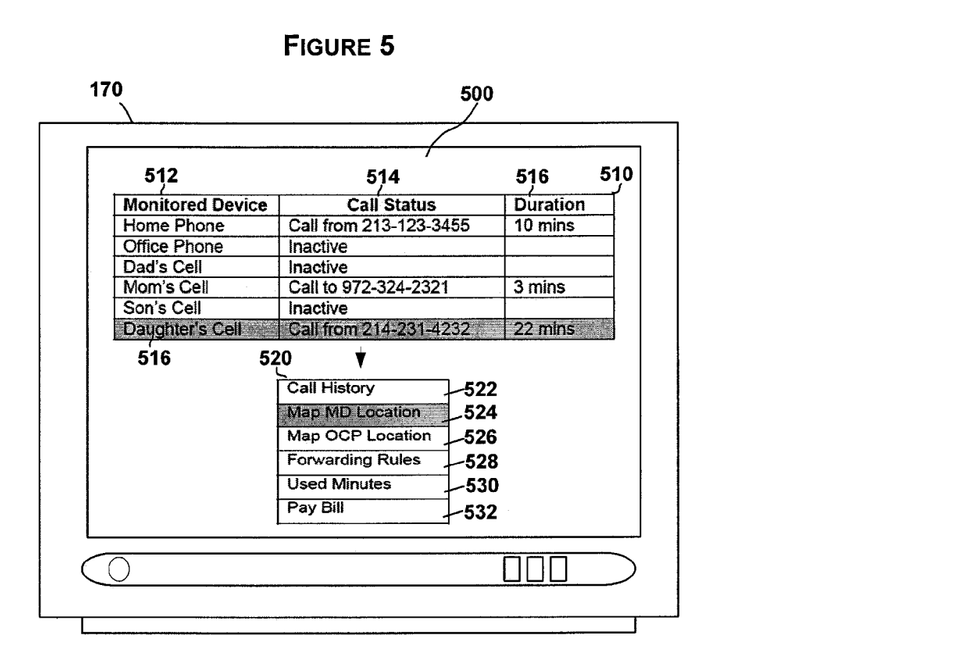
FIG. 5 depicts an embodiment of a user interface for depicting call status information in accordance with the disclosed embodiments.

With reference now to FIG. 5, an embodiment of a user interface 500 for depicting call status information associated with one or more monitored communication devices on a television is presented. In the depicted embodiment, user interface 500 depicts a table 510 comprising a monitored device column 512, a call status column 514, and a duration column 516. Monitored device column 512 contains a list of monitored communication devices associated with a subscriber. In some embodiments, the subscriber must authorize a service provider track the location of a monitored communication device. Call status column 514 respectively depicts a call status associated with a monitored communication device in monitored device column 512. For example, in some embodiments, the call status may include an indication of whether an outbound or inbound call has been placed to a monitored communication device. In addition, in some embodiments, the call status includes a phone number associated with the other calling party in communication with a monitored communication device. Further, in some embodiments, duration column 514 respectively depicts a call duration associated with an active call of a monitored communication device.

In some embodiments, user interface 500 may also include a submenu 520 comprising features and options associated with each monitored communication device. In some embodiments, submenu 520 may appear in response to a user selecting a highlighted monitored communication device from table 510, such as, monitored communication device 516. Submenu 520 may include, but is not limited to, a call history option 522, a map monitored communication device location option 524, a map other calling party location option 526, a call forwarding rules option 528, a used minutes option 530, and a pay bill option 532.

Call history option 522 enables a user to view the call history associated with the monitored communication device. For example, in some embodiments, the call history may include all information presented in table 510 for a selected monitored communication device. In addition, in some embodiments, the call history may include a list of incoming, outgoing, and/or missed calls associated with the selected monitored communication device. In one embodiment, the call history may be retrieved locally using the stored call logs. In other embodiments, the call history may be retrieved from a network server database.

Map monitored communication device location option 524 enables a user to view a map depicting the location of the selected monitored communication device. In some embodiments, a map may be dynamically updated, i.e., without user intervention, in response to receiving updated location information associated with a monitored communication device. In addition, as will be further described, map monitored communication device location option 524 may enable a user to retrieve directions/navigational instructions to a user-specified point of interest and/or address from a current location of the selected monitored communication device.

In some embodiments, map other calling party location option 526 may enable a user to view a map depicting the location of a communication device associated with the other calling party in communication with a selected monitored communication device. For example, in one embodiment, if the communication device associated with other calling party is a non-cellular device, the address associated with the other calling party's communication device may be retrieved from a line information database line information database (LIDB) 188. In some embodiments, particularly to mobile devices, map other calling party location option 526 is enabled only if the location service associated with the communication device of the other calling party is authorized/enabled by the other calling party.

Additionally, in some embodiments, call forwarding rules option 528 enables a subscriber to set call forwarding rules associated with a monitored communication device. For example, in one embodiment, set top box 160 may access a call forwarding configuration file on data processing system 124 for enabling a user to configure call forwarding options using set top box 160.

In one embodiment, used minutes option 530 displays real-time usage minutes for a current billing cycle associated with a selected monitored communication device. For example, in some embodiments, set top box 160 may retrieve the usage information from a billing database. Alternatively, in some embodiments, set top box 160 may locally calculate the usage information using data from the locally stored call logs.

Additionally, in some embodiments, pay bill option 532 enables a user to view and/or pay for services provided by a service provider associated with the monitored communication devices. For example, in some embodiments, set top box 160 may communicate with a pay processing server and a billing database server via IP network 110 for processing payments. In some embodiments, set top box 160 may store a subscriber payment information, such as, credit card information, for enabling a user to pay for services without having to manually input the payment information each time. In addition, the user may modify the stored payment information in the event that the information changes.

Figure 6:
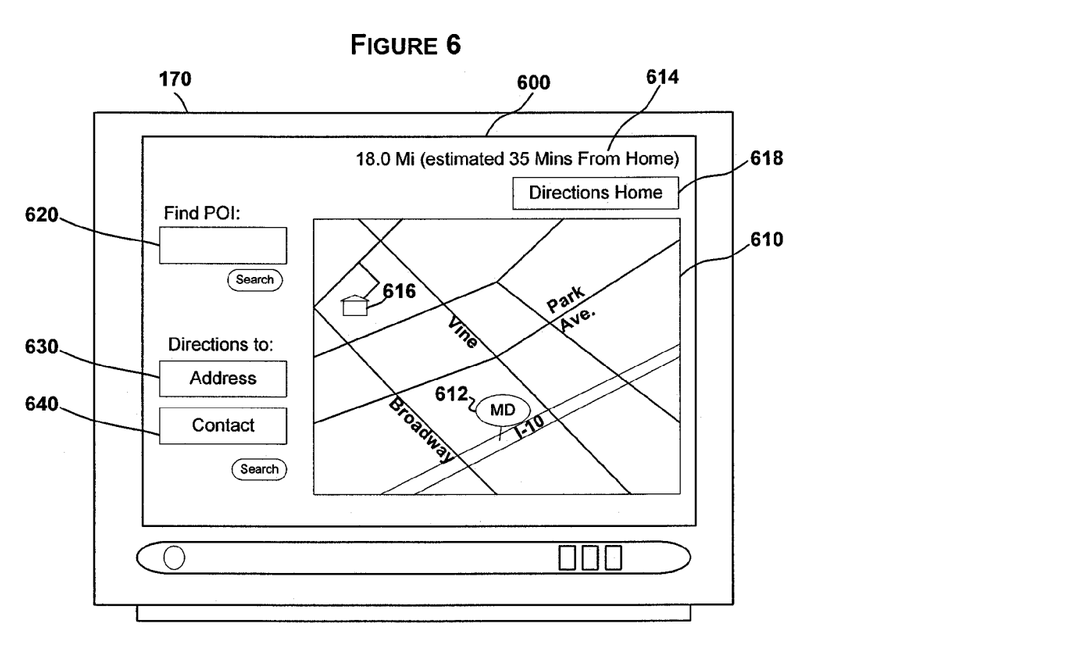
FIG. 6 depicts another embodiment of a user interface for providing location information associated with the monitored communication device.

With reference now to FIG. 6, an embodiment of a user interface 600 for providing, among other things, location information associated with a monitored communication device is presented. In the depicted embodiment, user interface 600 includes a map 610 depicting a current location 612 of a monitored communication device. In addition, in some embodiments, user interface 600 may include an estimated distance and travel time 614 from the current location 612 of the monitored communication device to a home location 616 associated with a subscriber of the monitored communication device. Further, in some embodiments, user interface 600 may include a user option 618 for presenting directions/navigational instructions from the current location 612 of the monitored communication device to the home location 616.

Further, in some embodiments, user interface 600 may include a data field 620 for enabling user input specifying a point of interest. In these embodiments, set top box 160 may communicate with a network server to determine one or more locations associated with the user-specified point of interest in the proximity of the current location 612 of the monitored communication device. For example, in one embodiment, set top box 160 passes a string comprising the user specified point of interest and a zip code associated with the current location 612 of the monitored communication device to a network search engine. The search engine returns a list of addresses associated with the user-specified point of interest to set top box 160. In some embodiments, set-top box 160 maps the list of addresses onto map 610. In one embodiment, set top box 160 may enable a user to select a particular location associated with the returned list of addresses to receive directions/navigational instructions to the user selected location from the current location 612 of the monitored communication device.

In addition, in some embodiments, user interface 600 may include an address data field 630 for enabling a user to retrieve directions/navigational instructions to a user-specified address. Further, in some embodiments, user interface 600 may include a contact option 640 for enabling a user to retrieve the address associated with a particular contact stored in a local or network address book and provide direction/navigational instructions to the location associated with the contact. In one embodiment, contact option 640 may enable a user to select a location associated with a prior communication made with the monitored communication device. For example, suppose a monitored communication device received a call from a business two days ago and set top box 160 captured the location of the business. The disclosed embodiments enable a user to quickly retrieve the address and receive directions to the business.

In summary, the disclosed embodiments enable, among other things, call status information associated with one or more communication device to be displayed on a television unit. In one embodiment, the call status information is passed from a data processing system located at a telephone switching office/center to a local cable head end associated with the subscriber of a monitored communication device. The cable head end routes the information to a set top box located at a home location of the subscriber. In addition, in some embodiments, the disclosed embodiments provide additional information associated with a monitored communication device, such as, but not limited to, a location of the monitored communication device.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. An integrated set top box for displaying information associated with a monitored communication device on TV, the integrated set top box comprising:
   a memory component for storing computer executable instructions;
   a data storage unit for storing data associated with at least one monitored communication device, the data comprising mapping data associated with a location of a second communication device in a current active call with the monitored communication device;
   a communication interface in communication with a cable head end for receiving, from the cable head end, communication data associated with the monitored communication device and television media content;
   a decoder for decoding the television media content; and
   a processing unit for executing the computer executable instructions to:
      generate a user interface using the mapping data to depict a geographic map associated with the location of the second communication device and using the communication data to depict a call status associated with the monitored communication device, wherein the user interface includes a duration indicator associated with a current active call of the monitored communication device, and a phone number and the location associated with the second communication device in the current active call of the monitored communication device; and
      present the user interface on a television coupled to the set top box.

2. The set top box of claim 1, wherein the processing unit further executes the computer executable instructions to present a number of used minutes for a current billing cycle associated with the monitored communication device.

3. The set top box of claim 1, wherein the processing unit further executes the computer executable instructions to present call history information associated with the monitored communication device.

4. The set top box of claim 1, wherein the user interface includes an option for a user to retrieve a location associated with a contact and provide directions to the location of the contact from a current location of the monitored communication device.

5. The set top box of claim 1, wherein the communication data includes the location of the monitored communication device.

6. The set top box of claim 5, wherein the processing unit further executes the computer executable instructions to present the location of the monitored communication device on a map.

7. The set top box of claim 6, wherein the processing unit further executes the computer executable instructions to dynamically update the map based on updated location information associated with the monitored communication device.

8. The set top box of claim 6, wherein the map is displayed on a dedicated channel.

9. The set top box of claim 7, wherein the processing unit further executes the computer executable instructions to receive a user specified address and provide navigational instructions from the updated location information of the monitored communication device to the user specified address.

10. The set top box of claim 7, wherein the processing unit further executes the computer executable instructions to:
    receive a user specified point of interest;
    locate one or more locations associated with the user specified point of interest in proximity of the updated location information of the monitored communication device; and
    provide navigational instructions from the updated location information of the monitored communication device to a user selected location from the one or more locations associated with the user specified point of interest.

11. The set top box of claim 7, wherein the processing unit further executes the computer executable instructions to dynamically display an estimated distance and an amount of time from a home location to the updated location information.

12. A method for displaying calling information associated with a monitored communication device, the method comprising:
    receiving, from a cable head end, communication data associated with the monitored communication device;
    retrieving, from a data storage unit, information including mapping data associated with a location of a second communication device in a current active call with the monitored communication device;
    generating a user interface using the mapping data to depict a geographic map associated with the location of the second communication device and using the communication data to depict a call status associated with the monitored communication device, wherein the user interface includes a duration indicator associated with a current active call of the monitored communication device, and a phone number and the location associated with the second communication device in the current active call of the monitored communication device; and
    presenting the user interface on a television.

13. The method of claim 12, further comprising presenting the location of the monitored communication device on a map.

14. The method of claim 13, further comprising dynamically updating the map based on updated location information associated with the monitored communication device.

15. The method of claim 14, further comprising:
    receiving a user specified address; and
    providing navigational instructions from the updated location information of the monitored communication device to the user specified address.

16. The method of claim 14, further comprising:
    receiving a user specified point of interest;
    locating one or more locations associated with the user specified point of interest in proximity of the updated location information of the monitored communication device; and
    providing navigational instructions from the updated location information of the monitored communication device to a user selected location from the one or more locations associated with the user specified point of interest.

* * * * *